Patented Apr. 29, 1930

1,756,400

UNITED STATES PATENT OFFICE

MAXIMILIAN PAUL SCHMIDT AND WILHELM KRIEGER, OF WIESBADEN-BIEBRICH, GERMANY, ASSIGNORS TO KALLE & CO., AKTIENGESELLSCHAFT, OF WIESBADEN-BIEBRICH, GERMANY

LIGHT-SENSITIVE MATERIALS AND PROCESS OF MAKING THEM

No Drawing. Application filed January 28, 1928, Serial No. 250,326, and in Germany February 22, 1926.

The present process relates to light-sensitive films and layers and process of making them.

We have found that light-sensitive stable diazo compounds can be incorporated into solutions or emulsions of cellulose derivatives the hydrogen atom of at least one hydroxyl group of which is substituted, particularly alkyl cellulose, nitro-cellulose, acetyl-cellulose or the like, and that light-sensitive films and layers can be prepared by means of these solutions or emulsions. Light-sensitive compounds, such as are used in making so-called "diazo-types" i. e. in the art of producing pictures by means of diazo compounds, have proved to be particularly suitable for the said purpose.

Our invention is based on the surprising discovery that for instance an aqueous solution of methyl cellulose, which in general has a very great tendency to coagulate, when mixed with, for example, a slightly acidified solution of diazotized p-aminodiphenylamin and 1.8-aminonaphthol-3.6-disulfonic acid remains quite clear. For instance by pouring such an alkyl cellulose solution admixed with a light-sensitive substance upon glass or any other smooth surface, clear films are obtained which can easily be drawn off. The said solutions can also be applied in even layers upon paper, fabrics and similar materials which they firmly adhere to. There may also be added to the solutions some softening agents and coloring matters.

Instead of alkyl cellulose there may in our new process also be used another cellulose-ester or ether, such as nitro-cellulose, acetyl cellulose, or the like, so far as they are soluble in such organic solvents or mixed solvents as will permit at the same time to incorporate into the solution of the cellulose ester or the cellulose ether mixture the light-sensitive substances in question. The new process can be applied in the preparation of positive as well as negative diazotypes. In order to obtain positive-pictures, it is advisable to use the diazo compound in combination with an azo component. There are, for instance, obtained materials suitable for the preparation of negative diazo types, by adding diazotized aminosalicylic acid to a solution of a cellulose ester. In this case, the development of the negative picture may be accelerated by subjecting the film, before exposing it to light, for some time to the action of an alkali, preferably gaseous ammonia. In preparing negative pictures it is useful to subject them to an after-treatment with a suitable solvent in order to eliminate any undecomposed diazo compound.

The following examples serve to illustrate how the invention may be carried out, but the invention is not confined to these examples; the parts are parts by weight.

(1) 50 parts of a purified aqueous solution of methyl cellulose of 8-10% strength are mixed with 10 parts of a weakly mineral-acid light-sensitive solution containing 1.5 parts of p-phenyliminoquinonediazide sulfate and 1 part of resorcylic acid in 100 parts of water. By pouring the mixture on a suitable base, as paper and so on layers are obtained which can be dried at ordinary temperature or at an elevated temperature. It is advantageous, to add a metal salt to the light-sensitive solution.

(2) 10 parts of celluloid waste are dissolved in 50 parts by volume of alcohol and 25 parts of ether and to this solution is added a solution of 0.4 part of boron fluoride of the diazo compound of 4-amino-1-monoethylamino-2-toluene, 0.2 part of resorcin and 0.1 part of tartaric acid in 25 parts by volume of alcohol. After having intimately mixed the mass, the mixture is spread on a suitable base, whereupon, after evaporation of the solvent, a clear, feebly yellow film is obtained. The film is then exposed to light under a positive and then developed, preferably in an atmosphere of gaseous ammonia, thus yellowish brown positive pictures are obtained.

A similar film is obtained by mixing acetyl cellulose in a suitable solvent to which alcohol and a softening agent such as lactic acid ester is added, with the above described diazo solution and spreading the mixture on a base.

(3.) If a solution of 0.4 part of the diazo compound of the boron fluoride of 4-amino-1-monoethylamino-2-toluene, 0.2 part of resorcin, 0.1 part of tartaric acid, if required with 0.2 part of nickel chloride added thereto, in 25 parts by volume of alcohol is mixed with 75 parts by volume of a cellon lacquer and if the mixture is then spread, for instance on glass, firmly-adhering clear, light-sensitive layers are obtained, which, after exposure to light and development, also yield yellowish-brown positive copies.

We claim:

1. The process of preparing light-sensitive materials, which consists in incorporating a stable diazo compound into a solution of a cellulose derivative the hydrogen atom of at least one hydroxyl group of which is substituted.

2. The process of preparing light-sensitive materials, which consists in incorporating a stable diazo compound into a solution of a cellulose derivative the hydrogen atom of at least one hydroxyl group of which is substituted, and spreading the solution so obtained on a suitable base.

3. The process of preparing light-sensitive materials, which consists in incorporating into a solution of a cellulose derivative the hydrogen atom of at least one hydroxyl group of which is substituted, a stable diazo compound incapable of coupling per se with an azo-dyestuff component in a neutral or acid solution.

4. The process of preparing light-sensitive materials, which consists in incorporating into a solution of a cellulose derivative the hydrogen atom of at least one hydroxyl group of which is substituted, a stable diazo compound incapable of coupling per se with an azo-dyestuff component in a neutral or acid solution and spreading the solution so obtained on a suitable base.

5. The process of preparing light-sensitive materials, which consists in incorporating into a solution of a cellulose derivative the hydrogen atom of at least one hydroxyl group of which is substituted, a stable diazo compound incapable of coupling per se with an azo-dyestuff component in a neutral or acid solution, together with an azo-dyestuff component.

6. The process of preparing light-sensitive materials, which consists in incorporating into a solution of cellulose derivative the hydrogen atom of at least one hydroxyl group of which is substituted, a stable diazo compound incapable of coupling per se with an azo-dyestuff component in a neutral or acid solution, together with an azo-dyestuff component and spreading the solution so obtained on a suitable base.

7. A light-sensitive product consisting of cellulose derivative the hydrogen atom of at least one hydroxyl group of which is substituted, having incorporated into it a stable diazo compound incapable of coupling per se with an azo-dyestuff component in a neutral or acid solution.

8. A light-sensitive product consisting of cellulose derivative the hydrogen atom of at least one hydroxyl group of which is substituted, having incorporated into it a stable diazo compound incapable of coupling per se with an azo-dyestuff component in a neutral or acid solution, together with an azo-dyestuff component.

9. The process of preparing light-sensitive materials, which consists in incorporating a stable diazo compound into a solution of an alkylcellulose.

10. The process of preparing light-sensitive materials, which consists in incorporating a stable diazo compound into a solution of an alkylcellulose and spreading the solution so obtained on a suitable base.

11. The process of preparing light-sensitive materials, which consists in incorporating into a solution of an alkylcellulose a stable diazo compound incapable of coupling per se with an azo-dyestuff component in a neutral or acid solution.

12. The process of preparing light-sensitive materials, which consists in incorporating into a solution of an alkylcellulose a stable diazo compound incapable of coupling per se with an azo-dyestuff component in a neutral or acid solution and spreading the solution so obtained on a suitable base.

13. The process of preparing light-sensitive materials, which consists in incorporating into a solution of an alkylcellulose a stable diazo compound incapable of coupling per se with an azo-dyestuff component in a neutral or acid solution, together with an azo-dyestuff component.

14. The process of preparing light-sensitive materials, which consists in incorporating into a solution of an alkylcellulose a stable diazo compound incapable of coupling per se with an azo-dyestuff component in a neutral or acid solution, together with an azo-dyestuff component and spreading the solution so obtained on a suitable base.

15. A light-sensitive product consisting of an alkylcellulose having incorporated into it a stable diazo compound incapable of coupling per se with an azo-dyestuff component in a neutral or acid solution.

16. A light-sensitive product consisting of an alkylcellulose having incorporated into it a stable diazo compound incapable of coupling per se with an azo-dyestuff component in a neutral or acid solution together with an azo-dyestuff component.

17. The process of preparing light-sensitive materials, which consists in incorporating a stable diazo compound into a solution of water soluble methylcellulose.

18. The process of preparing light-sensitive materials, which consists in incorporating a stable diazo compound into a solution of water soluble methylcellulose and spreading the solution so obtained on a suitable base.

19. The process of preparing light-sensitive materials, which consists in incorporating into a solution of water soluble methylcellulose a stable diazo compound incapable of coupling per se with an azo-dyestuff component in a neutral or acid solution.

20. The process of preparing light-sensitive materials, which consists in incorporating into a solution of water soluble methylcellulose a stable diazo compound incapable of coupling per se with an azo-dyestuff component in a neutral or acid solution and spreading the solution so obtained on a suitable base.

21. The process of preparing light-sensitive materials, which consists in incorporating into a solution of water soluble methylcellulose a stable diazo compound incapable of coupling per se with an azo-dyestuff component in a neutral or acid solution, together with an azo-dyestuff component.

22. The process of preparing light-sensitive materials, which consists in incorporating into a solution of water soluble methylcellulose a stable diazo compound incapable of coupling per se with an azo-dyestuff component in a neutral or acid solution, together with an azo-dyestuff component and spreading the solution so obtained on a suitable base.

23. A light-sensitive product consisting of water soluble methylcellulose, having incorporated into it a stable diazo compound incapable of coupling per se with an azo-dyestuff component in a neutral or acid solution.

24. A light sensitive product consisting of water soluble methylcellulose, having incorporated into it a stable diazo compound incapable of coupling per se with an azo-dyestuff component in a neutral or acid solution, together with an azo-dyestuff component.

In testimony whereof, we affix our signatures.

MAXIMILIAN PAUL SCHMIDT.
WILHELM KRIEGER.